(12) United States Patent
Trezza

(10) Patent No.: US 6,889,010 B2
(45) Date of Patent: May 3, 2005

(54) STAR TOPOLOGY NETWORK WITH FIBER INTERCONNECT ON CHIP

(75) Inventor: John A. Trezza, Nashua, NH (US)

(73) Assignee: Altera Corporation, Santa Clara, CA (US)

( * ) Notice: Subject to any disclaimer, the term of this patent is extended or adjusted under 35 U.S.C. 154(b) by 572 days.

(21) Appl. No.: 09/732,432

(22) Filed: Dec. 7, 2000

(65) Prior Publication Data

US 2002/0003640 A1 Jan. 10, 2002

Related U.S. Application Data

(63) Continuation-in-part of application No. 09/653,727, filed on Sep. 1, 2000, now Pat. No. 6,674,971, and a continuation-in-part of application No. 09/653,647, filed on Sep. 1, 2000, now Pat. No. 6,434,308.
(60) Provisional application No. 60/170,147, filed on Dec. 10, 1999.

(51) Int. Cl.[7] .................. H04B 10/08; H04B 10/00; H04J 14/00
(52) U.S. Cl. ............... 398/130; 398/23; 398/24; 398/66; 398/118; 398/124; 398/128; 398/138
(58) Field of Search ............... 398/23, 24, 66, 398/118, 124, 128, 130, 138, 135, 139, 140, 141, 153, 61, 58

(56) References Cited

U.S. PATENT DOCUMENTS

| | | | |
|---|---|---|---|
| 4,543,666 A | | 9/1985 | Witte et al. |
| 4,554,673 A | | 11/1985 | Stevens |
| 4,646,361 A | | 2/1987 | Usui |
| 4,716,408 A | | 12/1987 | O'Connor et al. |
| 4,781,427 A | * | 11/1988 | Husbands et al. ............ 385/24 |
| 4,940,306 A | | 7/1990 | Kitayama et al. |
| 5,127,067 A | * | 6/1992 | Delcoco et al. ............... 385/24 |
| 5,189,671 A | * | 2/1993 | Cheng ........................ 370/471 |
| 5,208,693 A | * | 5/1993 | Arstein et al. ............... 398/100 |
| 5,442,623 A | * | 8/1995 | Wu ............................. 370/224 |
| 5,506,711 A | | 4/1996 | Takeyari |
| 5,521,734 A | * | 5/1996 | Frigo .......................... 398/139 |
| 5,532,856 A | | 7/1996 | Li et al. |
| 5,535,036 A | | 7/1996 | Grant |
| 5,726,786 A | | 3/1998 | Heflinger |
| 5,858,814 A | | 1/1999 | Goossen et al. |
| 5,884,046 A | | 3/1999 | Antonov |
| 5,896,213 A | | 4/1999 | Nagahori et al. |
| 5,903,370 A | * | 5/1999 | Johnson ........................ 398/4 |
| 5,909,303 A | | 6/1999 | Trezza et al. |
| 6,523,177 B1 | * | 2/2003 | Brown ........................ 725/121 |

OTHER PUBLICATIONS

Krishnamoorthy, Ashok V., Firehose Architectures for Free–Space Optically–Interconnected VLSI Circuits, SPECIAL Issue on Parallel Computing with Optical Interconnects, Journal of Parallel and Distributed Computing, Nov. 1996, pp. 1–10 complete article also see marked up cover and p. 6 included.

(Continued)

*Primary Examiner*—M. R. Sedighian
(74) *Attorney, Agent, or Firm*—Maine & Asmus

(57) ABSTRACT

An optical transmission device configured as a central node, wherein each central node has dedicated pixels for receiving data and transmitting optical data so destination addressing is not required. The network is configured such that transmission on any particular receiver reserved pixels results in data being sent to a predetermined node. In particular, the star topology is configured as a receiver reserved scheme. The device is formed by constructing central node of transmitters and receivers that are attached to a silicon substrate with a processing means, and the optical interface to the transmitters and detectors on the central node establish a one-to-one correspondence with an individual fiber optic cable. The fiber optic cables are reconfigurable to different topologies or interconnections as each fiber optic cable has a known destination on the central node. Various topologies are possible using a star node as the building block.

19 Claims, 17 Drawing Sheets

OTHER PUBLICATIONS

Travers, Christine M. et al., VLSI Photonic Smart Pixel Array for I/O System Architectures, pub Jan. 1998, This is the best copy found.

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

No Author, Smart Pixel Array (SPA) for VLSI–Photonics, DARPA website, this is the best copy found.

PCT International Search Report dated Apr. 2, 2001 of International Application No. PCT/US00/33166 filed Dec. 7, 2000.

M. Ajmone Marsan et al, Modelling Slotted Multi–Channel Ring All–Optical Networks, IEEE, 1997, p. 146–153.

Marco Ajmone Marsan et al, Access Protocols for Photonic WDM Multi–Rings with Tunable Transmitters and Fixed Receivers, SPIE, pp. 59–72, vol. 26921.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, IEEE *Journal on Selected Areas in Communications*, Sep. 1989, pp. 1043–1051, vol. 7 No. 7.

* cited by examiner

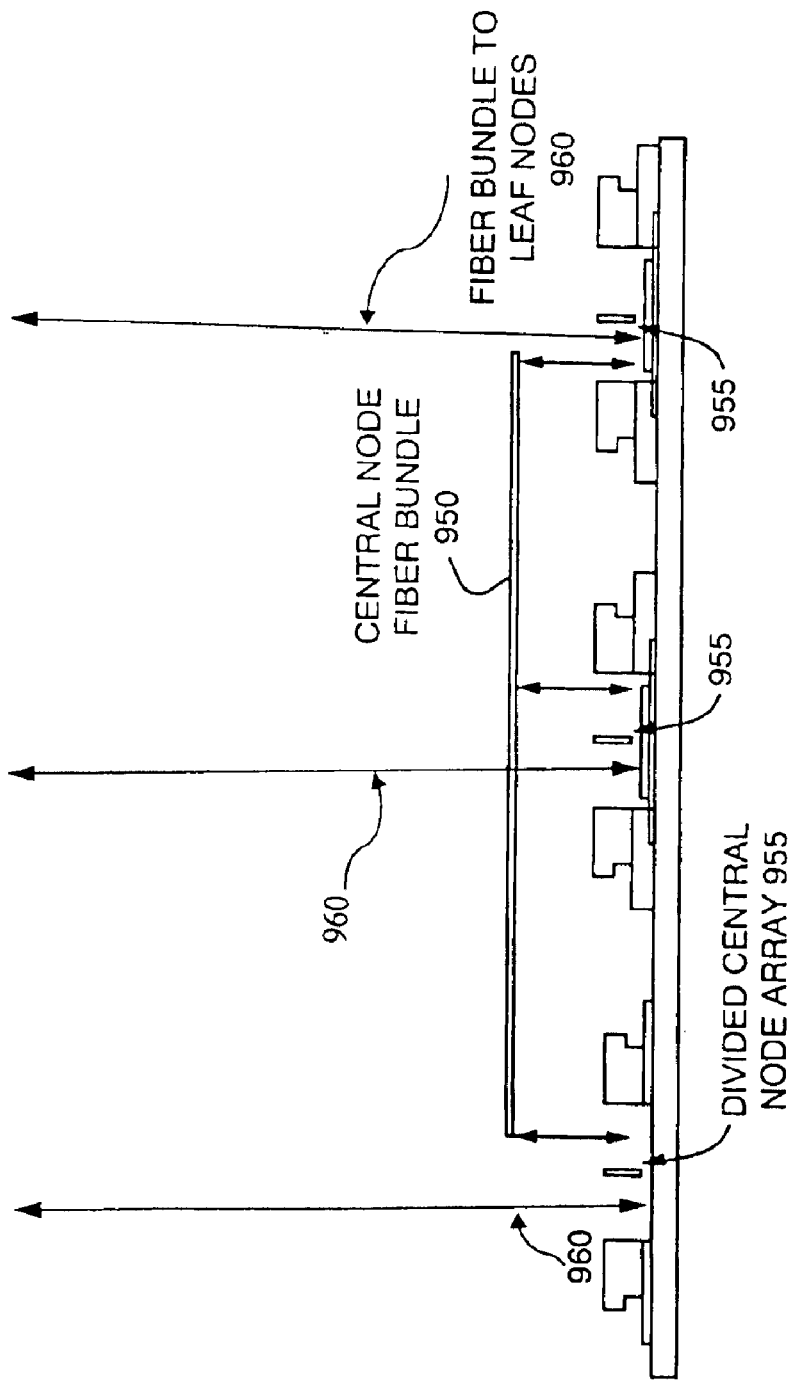

STAR TOPOLOGY NETWORK WITH FIBER INTERCONNECT ON CHIP

CROSS REFERENCE TO RELATED APPLICATIONS

This application claims priority from now abandoned U.S. patent application Ser. No. 60/170,147 filed on Dec. 10, 1999 which is incorporated herein by reference for all purposes. This application is a continuation-in-part of U.S. application Ser. No. 09/653,727 entitled an OPTICAL COMMUNICATION NETWORK WITH RECEIVER RESERVED CHANNEL, filed Sep. 1, 2000 and now U.S. Pat. No. 6,674,971; and a continuation-in-part of U.S. application Ser. No. 09/653,647 entitled OPTOELECTRONIC CONNECTOR SYSTEM, filed Sep. 1, 2000 and now U.S. Pat. No. 6,434,308, which are hereby incorporated by reference for all purposes.

BACKGROUND OF THE INVENTION

1. Technical Field of the Invention

This invention most generally relates to data transfer and communication network. In particular, the present invention relates to a device and system for high bandwidth data transfer using fiber optics.

2. Background of the Invention

Technological advancements have dramatically increased the capabilities and possibilities of computing electronics. The increased bandwidth and data transfer rates have resulted in commercial innovation and scientific advancements in many fields. However, data transfer continues to be a bottleneck. Present network communications that connect a multiple of nodes suffers from inefficiencies that bog down high-speed data communications.

A driving factor leading to ever increasing demands for faster data transfer rates is the need to do tasks that are more complex, requiring multiple computing nodes to cooperate. Digital signal processing, image analysis, and communications technology all require a greater bandwidth. The demand for increased data transfer capability and greater bandwidth translates into increases in both the speed of the data transfer, and the amount of data that is transferred per unit time.

Latency is defined as the amount of time it takes for data to be sent from a source node to a destination node. One of the key impediments to significantly increasing the speed with which communications devices can communicate with one another is the very limited capability of existing systems to transfer data in parallel. A significant source of latency is the need for reading and interpreting the address of each data packet, whether or not the data is intended for that particular device. The process of reading and interpreting packet destination addresses is done at each device in the network, and results in a dramatic limitation in the speed of data transfer within the network.

In general, the problems associated with data transfer on a system network can be alleviated by increasing the number of data transfer lines and transferring the data in parallel, and/or increasing the transmission speed. But, there are limitations to the number of I/O lines, such as spacing and size requirements, noise problems, reliability of connectors, and the power required to drive multiple lines off-chip. Increasing the transmission speed also has some limitations, as increasing the speed also increases power requirements, introduces timing skew problems across a channel, and usually requires more exotic processing than is standard practice. Combining higher clock speeds and more I/O connections in order to increase bandwidth is exceedingly difficult and impractical using electronics alone. Thus, using traditional technology there is a practical limitation in traditional data transfer notions, and the associated problems that are well known in the art.

A local area network (LAN) is a means of interconnecting multiple computers. A variety of standards exist, with the most popular perhaps being the family of "Ethernet" standards (ANSI/IEEE standard 802.3 and others). Like a computer system bus, an Ethernet network consists of a shared medium (coaxial cable) over which all data is transferred. LAN's typically have lower bandwidth than system busses, but allow nodes to communicate at larger distances. Several Ethernet standards exist, with data transfer rates of 10 Mbps (millions of bits per second), 100 Mbps and 1 Gbps. Nodes may be separated by distances of up to 100 meters using Ethernet, which is much greater than system bus dimensions that are typically a fraction of a meter.

Local area networks such as Ethernet carry the bulk of the data transfer between systems and individual users. Ethernet, in fact, is a very widely used communications standard for most local area networks. In general, there are three types of LAN networks, namely the linear bus, ring, and star.

The linear bus network is shown in FIG. 1, where a plurality of nodes 10 are interconnected along a line 5. The parallel node connections are effected through direct connection or attenuation taps. Unfortunately, fiber optics are not easily amenable to a parallel interface and using fiber optics for linear bus networks is difficult to implement. In addition, the parallel structure requires extensive addressing and contention remedies which decreases efficiency.

One of the more common original network topologies is the ring network shown in FIG. 2A. The ring topology enables communication around a ring serially through each of a number of nodes 20. Each user or node 20 transmits data messages serially around the ring in a clockwise or counterclockwise direction by some form medium of transmission 30 such as free-space optics using mirrors, or through direct connections such as fiber optics.

The vast majority of Fiber Distributed Data Interface (FDDI) rings transmit clockwise and counterclockwise simultaneously as illustrated in FIG. 2A. This bi-directional transmission technique is used to assure that data transmission will continue around the ring in cases where a single node becomes inoperable. However, when two nodes on either side of a working node become inoperable, communications from that working node will cease.

A drawback of the ring topology is the data transmission delay or latency incurred as the message is passed through each node. Local area network systems are typically limited to twenty-five nodes or less in an effort to limit accumulated system latency. Large systems are typically partitioned into several rings in an effort to manage system latency.

FIG. 2B illustrates one embodiment of a multi-Ring LAN system using partitioning to manage latency effects. Reducing the number of nodes within the ring reduces latency within each ring. The intersecting B Node 40 provides a data communications "bridge" between each ring 50, 60, thereby enabling communication between the rings 50, 60. As shown in FIG. 2B, for a bi-directional system, the maximum amount of delays between any two nodes within a single ring 50 or 60 is three node delays. The maximum amount of node delay between Node A 70 of the first ring 50 and Node B 80 of the second ring 60 is seven node delays.

A further embodiment showing a three-ring Ethernet system is illustrated in FIG. 2C. The "B" nodes 100 provide a bridge between rings 110, 120, and 130. Again, the latency within each ring is improved by reducing the number of nodes within each ring. However, as the number of rings increases, the latency between outer rings increases. FIG. 2C illustrates eleven node delays between node NA 140 and Node NB 150 of the outer rings 110 and 130 respectively.

Demand for even higher speed data communications however has driven network design beyond just increasing the interconnect speeds to other network topologies in an effort to improve system latency and bandwidth.

The star network topology has emerged as a topology that is especially well suited to enable point to point communications with low latency. FIG. 3A illustrates one embodiment of a networked system utilizing a star topology that interconnects a plurality of nodes 210. In this embodiment, data transfer occurs through the central or center node 220. The advantage to this topology is that only a single node delay is incurred between nodes within the star network. However, a disadvantage of the star topology is the requirement that all data must be processed by the central node 220 in order to ascertain the destination address. The data packet includes information in the header, such as destination address, that is read by the central node each time a packet encounters a central node. The processing time for reading each packet contributes to overall latency.

For example, a data message from node 1 would travel to the central node 220. The central node reads the header of the data for the destination address and transfers the packet to node 5 as illustrated in FIG. 3A. A single node delay through the central node 220 is thus incurred for each data transfer within the star network.

FIG. 3B illustrates an embodiment of a three star network topology 250 where nodes "B" 300, 305 provides a bridge between star networks. In this embodiment, the maximum amount of delay between any two nodes is five node delays. For example, a data message from node NA would travel to the central node A 280 of the outer star, then through the bridge node B 300 to the center node 220 and bridged again at node B 305 by the middle star, then carried through to center node B 290 of the other outer ring before reaching its destination NB. The star network topology exhibits lower latency than the ring topology. If the bridge nodes 300, 305 are omitted—and center nodes 270, 280, 290 connected directly, the configuration is termed a "switch fabric" or "switch network".

An advantage of a switched network is that one pair of nodes can communicate simultaneously with a second pair of nodes, as long as there is no contention. Switched fabrics can also scale to hundreds or thousands of nodes, since all connections are point-to-point and capacitance does not grow linearly with the number of nodes. One problem with switched networks is that some contention may still exist in the network when more than one pair of nodes tries to communicate, since they both may need to use the same switch-to-switch link along their paths. An ideal switched network is called a "crossbar" and consists of a single large switch that connects directly to all nodes in the system, and can provide contention-free communications among them. Unfortunately, a full crossbar is difficult to manufacture and implement.

A number of switched fabric standards exist now or have been proposed to replace system busses, including Myrinet, RaceWay, the Scalable Coherent Interconnect (SCI), RapidIO, and InfiniBand. These are sometimes called "system area networks" (SANs) or "storage area networks" if used to connect processors to disk drives. Switch fabric standards are also in widespread use for local area networks, including switched Ethernet, Myrinet, and Asynchronous Transfer Mode (ATM).

Data transfer protocols are established by a number of standards. These standards all employ standard ways of formatting data in discrete chunks called frames or packets. The packet or frame establishes the format of the data and the various fields and headers are encapsulated and transmitted across a network. A frame or packet usually includes a destination address, control bits for flow control, the data or payload, and error checking in the form of cyclic redundancy checks (CRC) codes or an error correcting code (ECC), as well as headers and trailers to identify the beginning and end of the packet. As information is communicated between devices or systems, the address information is checked by each device or system in the network, and eventually the device of interest receives the data.

Whether transferring data within a circuit or connecting system-to-system, the limited bandwidth of conventional hardware does not satisfy the marketplace. For high data rate transmissions, fiber optics transmits data at Gigabit data rates. Fiber optic communication systems allow information to be transmitted by means of binary digital transmission. The data or information that is to be transmitted is converted into a stream of light pulses, wherein the presence of a pulse corresponds to the transmission of a binary "one," and the absence of light corresponds to the transmission of a binary "zero." An optical receiver is used to convert the stream of light pulses into an electrical signal that is processed to determine the transmitted information. Fiber-optic standards for LANs exist and are in widespread use today, including the FDDI, FibreChannel and several ATM physical layers.

Some attempts have been made to increase bandwidth and data transfer efficiency. The use of smart pixels to provide the required interconnection has been developed. "Smart Pixel" refers to the optical interconnection for digital computing systems such as switching systems and parallel-processor systems. For example, large numbers of optical transmitters and receivers are directly integrated with semiconductor electronic processing elements. The integrated optoelectronic circuits have several benefits, including efficiency of design.

Passive optical technology is used to provide point-to-point high bandwidth connectivity and nothing else. The underlying architecture does not support broadcast channels, one-to-many communications over a single channel, or one-to-all communications over a single channel, simultaneous many-to-many communications over multiple channels. The architecture simply implements multiple passive point-to-point interconnects with no broadcasting. Since this architecture cannot support broadcasting it will have limited use in computing and communications systems which require efficient broadcasting.

Furthermore, the passive optical architecture has power limitations as the number of receivers increases, because the architecture does not allow for the regeneration of optical signals. A fraction of each optical signal is delivered to each photodetector receiver through the use of partially reflective micromirrors. This free-space technique allows an optical signal to be delivered to a small number of receivers, but it cannot be used to interconnect a large number of receivers since the original optical signal can only pass through a limited number of partially reflective mirrors before the signal is lost.

Although some researchers have demonstrated Terabits/s serial connection, the methodology is overly complex and the price and size of these systems is impractical for system area networks. Recent innovations have permitted wavelength division multiplexing (WDM) systems to increase their bandwidth considerably, however, this is primarily a telecommunications, wide-area networking (WAN) solution. WDM systems are still relatively large and expensive, but compared to laying new fibers across the country the cost of the transmitters and receivers seems insignificant. For a local area network (LAN) or system area networks (SANs), WDM is generally cost-prohibitive and often will not meet form-fit-factors requirements. For LANs/SANs, the problems preventing effective wide bandwidth are: connector size and reliability, channel skew, wire impedance, and power dissipation.

Overall, the complexity and cost of the prior systems have prevented large-scale integration. Thus, there is a need for increased system bandwidth through both increased data rates and improved mechanical and electrical interconnects.

What is needed is a means for reducing the latency so that it is not a significant factor in limiting data transfer. In other words, what is needed is a way of transferring data from one node in a network to any other node in the network in a bit-parallel manner in such a way that each intervening node that touches the data (whether switch or network interface controller—NIC) minimizes the time required to process data through. In one case, the switch/device should act like wire or fiber and require no processing. What is needed is a way of resolving this address interpretation problem that eliminates the delay associated with the transfer of data. What is needed is a uniform device that can be used as both NIC and switch so that the switching function is essentially free and the NIC function is inexpensive. What is needed is a device that does not increase message latency by requiring packet loss checks and frequent retransmission of packets when contention occurs. Ideally, what is needed is a network with wide channels, fast links, small and reliable connectors, low power, low latency, and minimal impact on higher-level communication protocols. From a practical point of view, these features must be offered as a cost-effective solution.

SUMMARY OF THE INVENTION

The present invention concerns integrated circuit technology that enables bi-directional, high-speed computer network interconnection communication, particularly in a star configuration. The present invention employs laser emitters and detectors to be integrated onto a semiconductor substrate, making electrical connection with electronic circuitry previously built on that substrate. In one embodiment the star topology has a dedicated receiver channel.

The device is fabricated by building light emitting devices such as laser devices such as Vertical Channel Surface Emitting Lasers (VCSELs) or light emitting diodes (LEDs or RCLEDs) out of light-emitting semiconductor material such as gallium arsenide and other III-V compound materials including ternary and quaternary compounds. Once the devices are fabricated, the light emitting devices are "flip-chipped" onto the top of the silicon substrate. The devices are then electrically connected to CMOS circuitry fabricated onto the silicon substrate, through ball-grid contacts located on the bottom of the devices.

One embodiment of the present invention is a star network with a central optoelectronic array and multiple leaf nodes. The leaf nodes provide the optical transmitter and detector pairs for remote network locations, and the central node is divided into arrays that map directly to each leaf node. The central node contains some logic circuitry to direct data flow throughout the network. Data transmitted from each channel of each node moves into the central node where the data is buffered and routed according to the network protocol standard. The central node works with the necessary logic circuits to perform standard transmission protocols as well as receive data from all channels simultaneously.

One object of this invention is an optical transmission system with a receiver reserved convention (RRC). By increasing the available channels, each node has its own dedicated optical link (an RRC), even in very large networks. The optical system is formed by constructing arrays of transmitter/receiver pairs (transceivers) such that transmission on any particular RRC results in data being sent to a predetermined node.

In a preferred embodiment this receiver reserved convention is fabricated using semiconductor technology to incorporate the components of a node on a single IC or chip. And, the communication to/from the nodes is via fiber optic cables arranged to permit bi-directional data flow from the transceiver arrays.

The receiver reserved convention provides an efficient method of data transfer as each leaf node does not receive data intended for other leaf nodes in the network as in the case of conventional ring network LAN topologies. Each leaf node transmits data to an associate node on the network along a specific optical link, and the capability to transmit and receive data on specific optical links removes the need for logic circuits that buffer and route data at each node. The elimination of the buffer circuitry reduces the cost as compared to a conventional Ethernet ring topology and decreases latency as there is no need to read leaf node addressing.

An additional object of this invention is the use of RRC's to provide automatic and intrinsic addressing for the sending and receiving of data in a network. Destination addresses are part of the data being sent in the prior art as opposed to being intrinsic to the process of sending and receiving of data point-to-point without reading destination address information. The physical addressing scheme as opposed to an encoded header reduces end-to-end latency.

A further object is the capability of sending and receiving alternately or simultaneously to any and all nodes in a network a signal whose bandwidth is limited only by the size of the arrays used to form the RRCs.

Another object of this invention is the ability to operate as a crossbar switch to route incoming data. The bi-directional communications of the leaf nodes to the central node allow the central node to route incoming data from each leaf out to the appropriate output destination. Alternatively, the central node can take the data from each node and route it in a circular pattern and clock output data to the appropriate leaf node when the data is at the appropriate emitters. The later approach requires less complex circuitry, but has somewhat higher on-chip latency.

The star topology of the present invention is scaleable to larger and more complex networks. For example, a 1000 node system containing sixteen by sixteen arrays would require a central node with an array one thousand times larger than a sixteen by sixteen array. For large systems the central node array can be divided into several smaller arrays where each array is optically coupled. The central node fiber bundles interconnect the smaller central node arrays enabling the central node to operate at fiber optic speeds. The leaf nodes connect to the central node through optical fiber bundles.

In one embodiment, an interconnect is used to couple the laser emitters and laser detectors to the image guide fiber bundles or fiber optic arrays. The CMOS circuitry on the silicon substrate is electrically connected to the VCSEL devices and provides driver and receiver logic and potentially other Ethernet logic functions including, but not limited to, encryption/decryption, packet routing, packet encapsulation, packet segmentation/reassembly, and other network packet processing.

A novel feature of the present invention is having a relocatable fiber optic wave guide. The optical interconnect between the emitters and detectors is a structure retaining the plurality of optical fibers. In a typical scenario, the structure that bundles the fibers is aligned and placed in close proximity to the emitters and detectors so that the emitters and detectors of a given node are connected to an established fiber route. In one embodiment the fiber optic wave guide is physically interchangeable in order to couple to a different emitters or detectors within the array. The emitters and detectors of the silicon substrate are hard-wired structures and cannot change. However, the entire topology of the overall node can be modified by altering the fiber optic routing, thus altering the manner in which data is transmitted and received. This provides great flexibility and manufacturing efficiency as a lot of emitters and detectors that are arranged in a single format can be altered by physically changing the manner in which the fiber optic waveguides are connected. The combination of features in the physical interchange of the fiber optics in accordance with the teaching of the present invention provides novelty.

An object of the invention a low cost high-speed network design based on a star topology, utilizing fiber optics and two-dimensional (2D) optical interconnect technology.

An object of the invention is a system of elements where laser emitters and detectors along with associated wave guide fiber bundles provide a physical means of configuring network of various low cost topologies.

Yet a further object is for a system that is scalable with respect to the number of nodes on the network. Furthermore, array structures with different length of rows and columns are permitted.

Another object is the centralization of circuit complexity, which enables the peripheral nodes to transmit simultaneously within a star network array.

And yet a further object is the modularity of the central array which enables the array to be subdivided into smaller arrays that are interconnected by fiber optics while maintaining maximum fiber optic speeds.

A feature of the present invention is the ability to configure network channels by physically changing the position of optical fibers relative to the stationary position of laser emitters in a laser array. Each fiber optic waveguide is relocatable at the central node or at leaf nodes.

A further object of this invention is the modularity of the central array, which enables the array to be subdivided into smaller arrays that are interconnected by fiber optics while maintaining maximum fiber optic speeds. The present invention makes large spatial division multiplexed transceiver arrays and central nodes which allow hundreds to tens of thousands (or more) individual signals to be routed into a single CMOS chip for creating a star coupling node.

The ability to use a receiver reserved protocol or a circulating routing protocol or direct crossbar protocol within a single chip based system is one aspect of the present invention.

The ability of the individual leaf nodes to communicate with the central node over a multi-bit bus containing a few to tens of thousands of individual channels is also unique as compared with the serial single line system used today.

Another object of the invention is to selectively etch epoxy in specific regions to create sites for additional devices or photonic detectors. While this method is functional, it requires additional wafer handling steps to remove epoxy carbon residue, which results in lower yields and adds additional cost to the process.

Another advantage of this invention is achieved by maintaining data transmission within the fiber optic media and CMOS logic, so the number of interfaces to copper media is reduced, thereby improving system latency.

Another advantage of this invention is that it enables multiple leaf node configurations that can used within the network. The leaf nodes are cascadeable, and thereby lower system cost.

Another object of this invention is the capability of one node to interleave incoming data of various packet sizes (and intended for other nodes) with data to be sent to yet other nodes.

A further object is that data is sent in either direction in the case of a ring or mixed configuration. This allows the system to determine the best and/or shortest path to route communications. Another object is that each node has a watchdog function in which it watches its nearest neighbor for correct functionality. In the event a node fails, the nearest neighbor will wrap data from one direction to the other effectively "healing" the ring until the node is corrected. This improves fault-tolerance by distributing the switching function to many nodes. One failure will not impede the functionality of the entire network.

In distinction to the prior art, the present invention involves RRC's that enable extremely high bandwidth communication between many systems with no reduction in performance due to the simultaneous use of the RRC capabilities by any or all of the systems. An object of the invention is that the underlying topology is scalable.

Yet a further object of this invention is that it substantially increases aggregate bandwidth because the system is no longer pin-limited.

A practical upper limit is presently determined by the size of the reticles, power management, IC feature size, IC switch control complexity, and IC routing complexity. However such practical limits will disappear as technology advances. Even under existing technology, arrays as large as 1024×1024 are within the scope of the invention. Filling entire wafers with arrays has already been demonstrated, with arrays as large as 1000×1000.

One way to build large arrays, for example, is by attaching devices directly to a fan out fabric to make very large arrays. However as array sizes reach the order of 1,000,000×1,000,000, there would be enormous requirements for data and power for all of them to run all at the same time, but applications with enormous redundancy requirements or image processing links will require even larger arrays. Arrays can be extended to as large as 1M×1M, yielding in excess of $10^{15}$ bits/s aggregate raw bandwidth if each channel is clocked at 1 GHz. Regardless of these physical constraints, the protocol has no limit.

Most current computer protocols for SAN communication rely on narrow line widths (usually 1–16 data lines), transmit data point-to-point, and regenerate signals as needed until they get to their final destination. This process requires each intermediate node to decode the address information before passing data to the next point.

In one embodiment of the present invention, all of the transceiver pairs are connected via a fiber optic cable. The underlying physical transceivers provide enough bandwidth that the point-to-point connections do not need to use shared media for communication. As a result, there is no need to decode headers before making a decision to pass the data on or not. This combination of fast pass-through and unshared media provides a very low latency protocol with very high channel bandwidth. For example, a 32×32 element array with a 1 Gbit/sec per pixel results in a system transmission rate greater than 1 Tbit/sec and typical node-to-node latency of a couple of nanoseconds in point to point transmission and less than 50 nanoseconds between furthest neighbors in ring configurations. As clock speeds increase, these delays decrease.

It should be noted that the optical fiber may be composed of a single physical fiber that carries all of the light from an emitter or to a detector. Alternatively, the optical fiber can be composed of a multitude of physical fibers each of which carry a portion of the total light from an emitter or to a detector.

This invention not only enables significantly greater bandwidth to be used by multiple systems simultaneously, but with addressing and the decoding of the addresses being an intrinsic part of the invention, the presence of receiving node address information within the data stream itself (which is currently a practice dictated by necessity) becomes redundant. Therefore, because of not only the increase in system bandwidth, but because it is no longer necessary to include addressing information in data streams, there is time and pixel space to include other functions without time penalty. For example, it is possible to incorporate error checking or other security procedures.

Most importantly, the complexity of the control is greatly reduced as are the number of pins required to get data on and off chip. That is, the input-output (I/O) function is distributed across many integrated circuits rather than trying to build one large central IC switch. These two features allow significantly larger "crossbars" to be built without affecting reproducibility. Specifically, the logic complexity changes from the order of $N^2$ to the order of N and the number of pins at any given node decreases from 2N×M to 2M, where N is the number of input ports and M is the number of lines in a channel.

One embodiment is a system that can be scaled up to arbitrarily large amounts of data, as long as several conditions are satisfied: (1) Each channel on each node has a FIFO buffer as long as the longest packet; or (2) the communication protocol software includes an arbitration scheme that allows connection oriented transmission that avoids contention at the hardware level. When the amount of data exceeds the capacity of the FIFO size, then there are multiple transmissions of data as separate packets. Thus, in general, if there are N bits of data to be sent through nodes set up with channels with M bits, there will be Ceiling (N/M) transmissions of data from Node A (where the function Ceiling (x) is the smallest integer not less than x), where the last transmission will be for less than M bits if N/M is not an integer. These transmissions will be followed by Ceiling (N/M) receptions and transmissions of data at Node B as that node passes the data to the next Node. To prevent FIFO overflow, the local CPU must wait before sending a packet on a channel until that channel's FIFO is empty. Alternately, a CPU might be required to get an acknowledgement packet from the destination before sending the next packet, in the communication protocol software. In summary, long and variable data message lengths are possible, but require protocol and/or hardware features to resolve.

Although one embodiment is to use a dedicated receiver channel for each node, there are alternate embodiments that can be used. One alternate method is to encode a source address and/or destination address(es) in the first few bits of header data. For transmitting large quantities of data from relatively few sources, or if the data comes from multiple units of time in a packet, this method would be efficient. There are some prior attempts at such encoding.

If there were a large quantity of data or a high degree of contention for receiver channels, one solution is to have a dedicated pixel for each transmitter-receiver pair. Then, for example, if data is received on a specific channel and on a specific pixel, then that data was from a specific node. An alternate way of describing this is to consider a two-dimensional grid of channels, where Node N always transmits on column N and always receives on row N. Then, if Node 1 wanted to talk to Node 3 it would use only the pixel(s) in row 1, column 3. Since now $N^2$ pixels are required for N nodes, fewer pixels and hence less bandwidth is available for each channel, which may be a disadvantage. On the other hand, this scheme has the advantage that no contention occurs on any of the channels and hence no FIFOs are required to buffer packets before sending them on to the next node. This scheme is called the "send-receive pair reserved channels" scheme (SRPRC).

The clock signal can be embedded in the data. Alternatively, it can be a separate pixel. If the clock signal is not embedded a phase-locked loop (PLL) needs to be included on every input channel, which costs more in terms of design time, integrated circuit real-estate, and power. Since the present system has more bandwidth, it is practical to have a separate pixel as a baseline with the option of moving to the PLL solution.

The minimum quantity of transceivers for a receiver reserved scheme is one transmitter and one receiver. There is no relation between the number of bits and the number of nodes. For example, one could have a 2×8 structured node, or a 1×16 structured node. From another perspective, there is a very strong correlation between the channel size and the routing complexity. Increasing the number of channels, and decreasing the channel width, makes the switch control more difficult. Decreasing the number of channels, and increasing the channel width, makes power distribution and skew management more difficult. Roughly speaking, it is easiest when channel width is about the same size as the number of channels.

Today's architectures generally use a shared medium, (e.g., SCI or Fiber Channel Arbitrated Loop). The present invention provides non-shared channels that are completely independent. Furthermore, an off-chip interface can be implemented in several ways. One embodiment described herein is to have a single computing source directly attached to a node. A second embodiment allows multiple nodes to access the off-chip interface, essentially time-division multiplexing the gate controller among multiple CPU's. Yet another implementation would be to double or triple the I/O pins at a node and enable multiple channels off a chip. This type of node might be appropriate for a central controller that was receiving significantly more data than other nodes. Alternatively, a complete multi-port network could be established for networks that need fewer node ports, but higher channel bandwidth. All of these configurations are easily implemented using the RRC scheme.

Data is packetized for transmission. Since data on channel has precedence, a node trying to send out a message may have the message interspersed through another message, or perhaps several messages. This data interleaving is a natural part of the protocol as each node tries to push its data out as fast as possible. Accordingly, the receiver has to reconstruct the original message based on the header information in the packet that identifies the source node and the packet ID and packet sequence number. This feature inherently adds fairness to the system since long, low-priority packets cannot be queued up blocking more important data.

Because an individual node can send the same data on all channels simultaneously, this invention has tremendous fan out capability. Data can be sent to all other nodes from a given node if it is sent on all channels at the same time. However, the data arrives at destination nodes with some delay due to the transceiver action at intermediate nodes. Nodes with the greatest number of other nodes between the sending node and the receiving node suffer the worst delay. The data can also be sent serially in the sense that data going from one node to another with nodes in between can be read by the intervening nodes. The receiver reserved feature is used to implement efficient broadcasting in the network, for example by designating one of the channels as being the broadcast channel that all nodes receive on.

In a ring or mixed architectural configuration, each node has a watchdog function in which it watches its nearest neighbor for correct functionality. In the event a node fails, the nearest neighbor will wrap data from one direction to the other, effectively "healing" the ring until the node is corrected. Thus fault-tolerance is into the system. This technique is known in the prior art and is in use today in single-fiber standards like FDDI (the Fiber Distributed Data Interface).

A related operability issue is the confinement of the CMOS circuitry to a small enough region that the array size is not forced to be larger than is optimal. However, there are approximately 100 um×100 um of area available for each pixel, plenty of room for a fair amount of logic per pixel with current integrated circuit device geometries.

Another operability issue is that with especially large arrays, there is increased potential for errors due to noise, device failures, and bit errors, so there may need to be additional error correction features.

Another operability issue, one that applies in particular to especially large arrays (e.g. of the order of 1M×1M arrays), is the large amount of power that is required run all of the pixels at once. Segmenting the arrays allows more room for providing access to the transceiver elements, and improvements in device design and specialized cooling systems allow much of the associated cooling problems to be addressed.

A further object is the ability to subdivide the central node into smaller nodes and connect them together with fiber bundles and still maintain full fiber optic speed at the central node.

Another object of this invention is the ability to run standard network protocols within the CMOS logic of the central node Another object of the invention is isolating the complexity of the star system within the central node, thereby reducing complexity at each leaf node. Another object of this invention is flexibility in organization of the leaf nodes that can be accommodated by the central node. The modularity of the central array enables the array to be subdivided into smaller arrays that are interconnected by fiber optics while maintaining maximum fiber optic speeds.

One of the advantages of the present invention is the ability to reconfigure a network topology by redirecting the fiber bundles. An additional difference is the use of large spatially division multiplexed transceiver arrays and central nodes which allow hundreds to tens of thousands (or more) individual signals to be routed into a single CMOS chip for creating a star coupling node. The ability to use a receiver reserved protocol or a circulating routing protocol or direct crossbar protocol within a single chip based system according to the system described herein is also a feature of the present invention. The ability of the individual leaf nodes to communicate with the central node over a multi-bit bus containing a few to tens of thousands of individual channels is also unique, compared with the serial, single line system.

Still other objects and advantages of the present invention will become readily apparent to those skilled in this art from the detailed description, wherein we have shown and described only certain embodiments of the invention, simply by way of illustration of modes contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

FIG. 10B side view of integrated circuit showing partitioning

DETAILED DESCRIPTION OF THE INVENTION

To those skilled in the art, the invention admits of many variations. The following is a description of one embodiment, offered as illustrative of the invention but not restrictive of the scope of the invention. This invention involves a method and apparatus for transferring data within the nodes of a communication system. The invention is a dramatically increased capability for transmitting and receiving data within a network. These novel aspects will be discussed in terms of several scenarios that demonstrate the various aspects of the invention.

Figure 1:
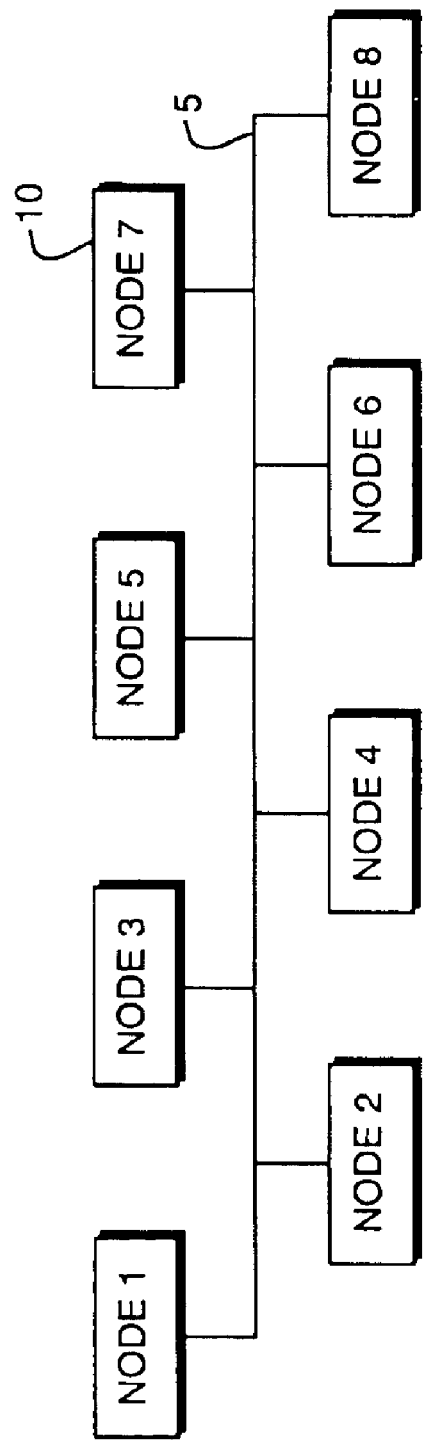
FIG. 1 prior art linear bus configuration
Figure 2A:
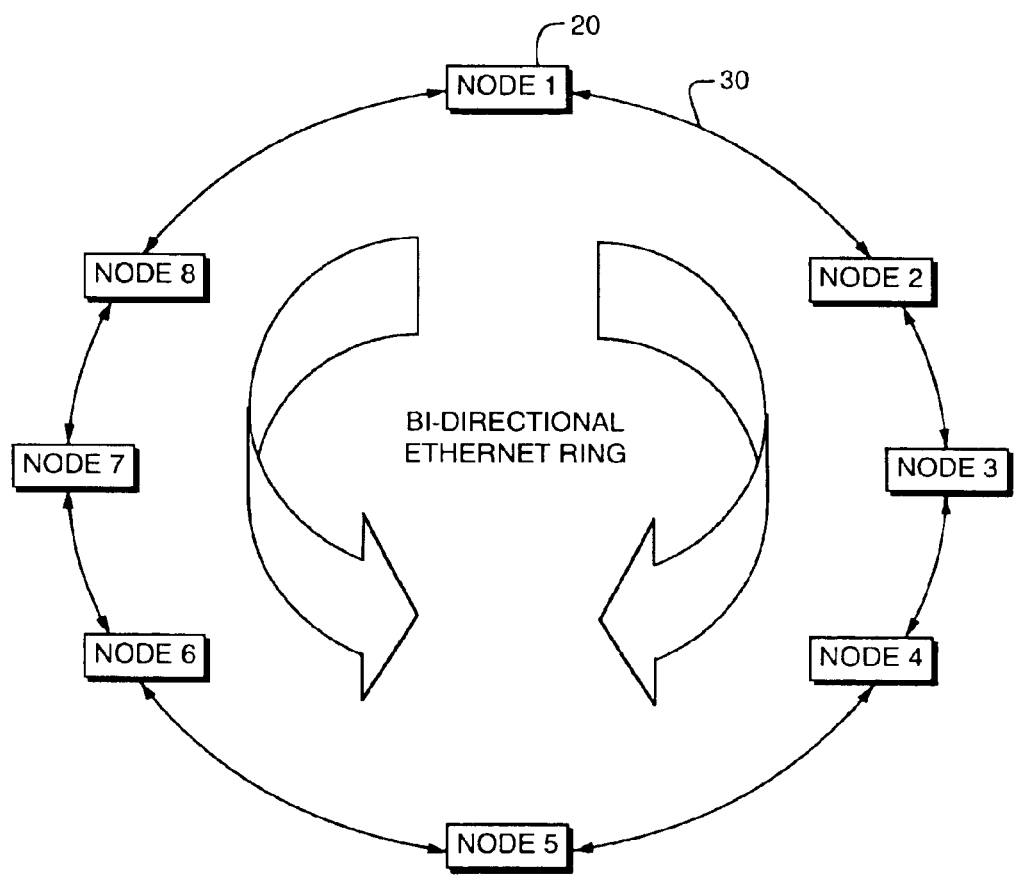
FIG. 2A prior art ring topology with one ring
Figure 2B:
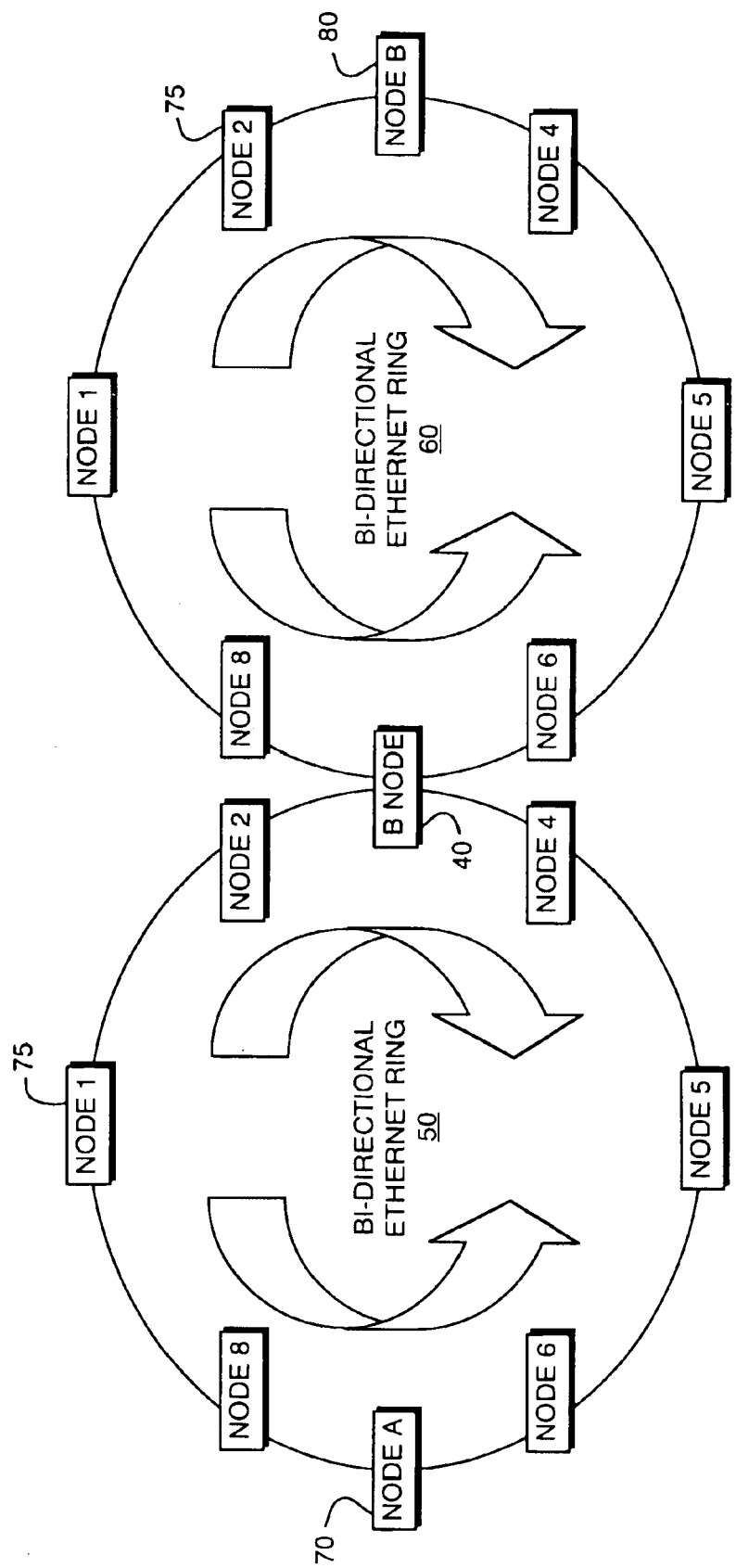
FIG. 2B prior art ring topology with two attached rings
Figure 2C:
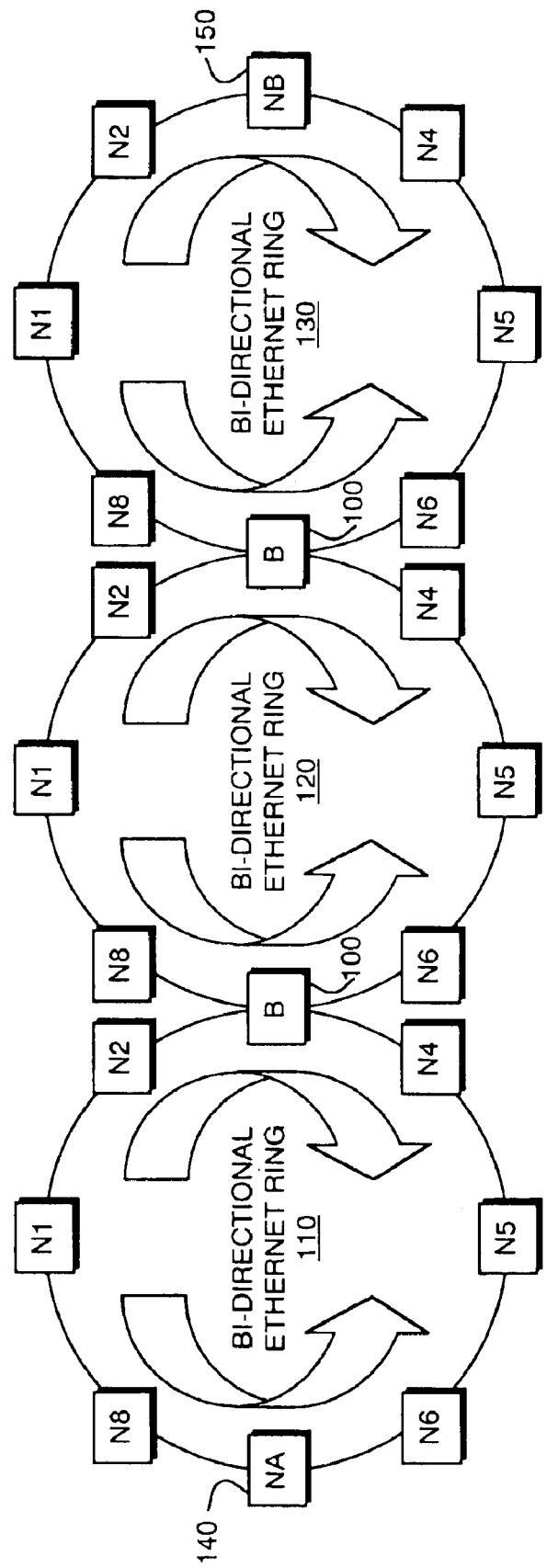
FIG. 2C prior art ring topology with three attached rings
Figure 3A:
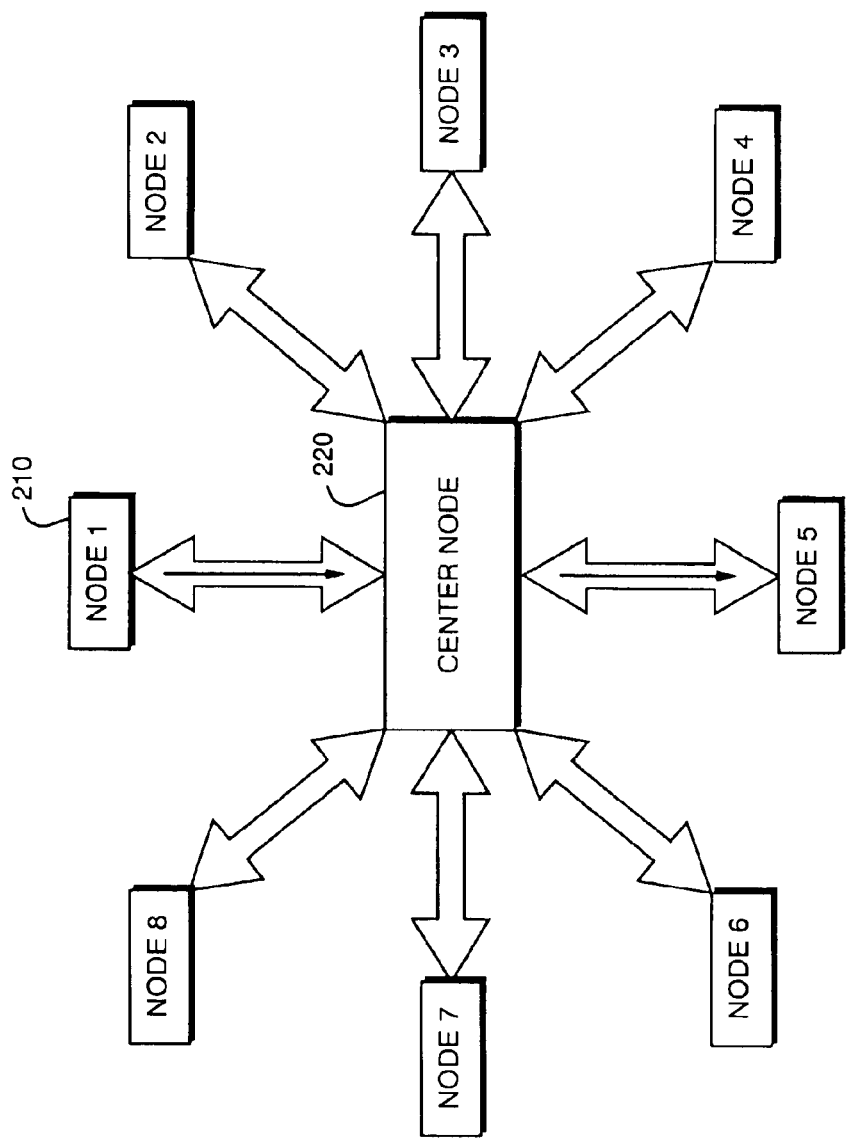
FIG. 3A prior art depiction of star network with nodes
Figure 3B:
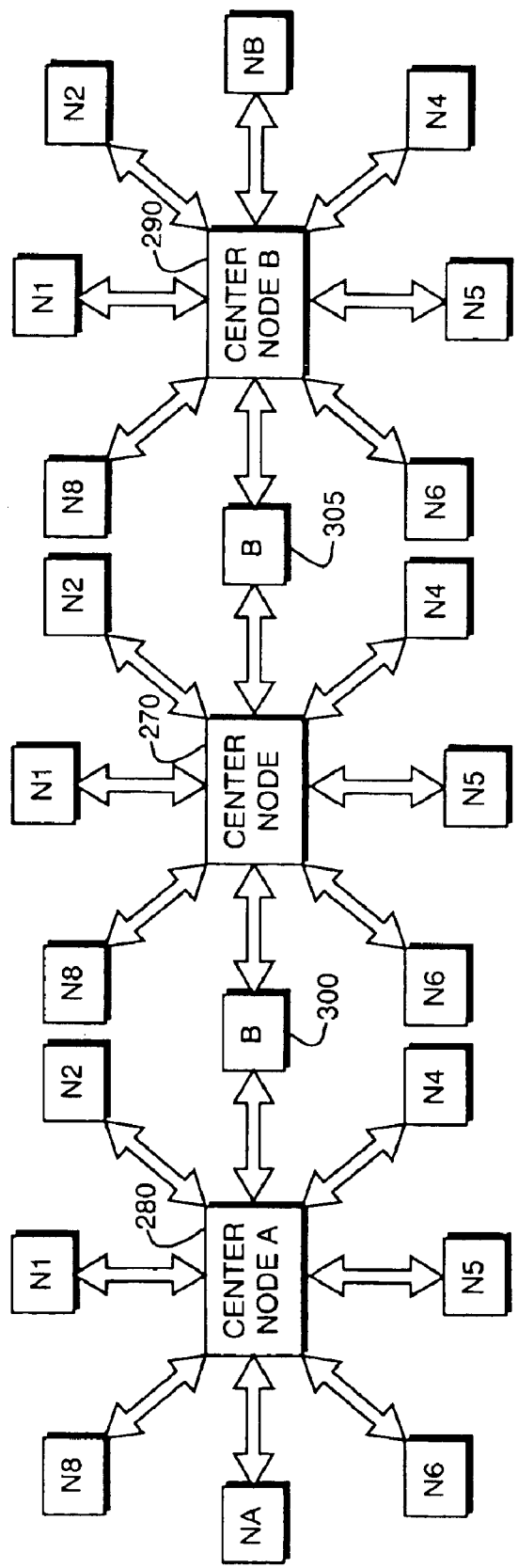
FIG. 3B prior art star network with three stars connected
Figure 4:
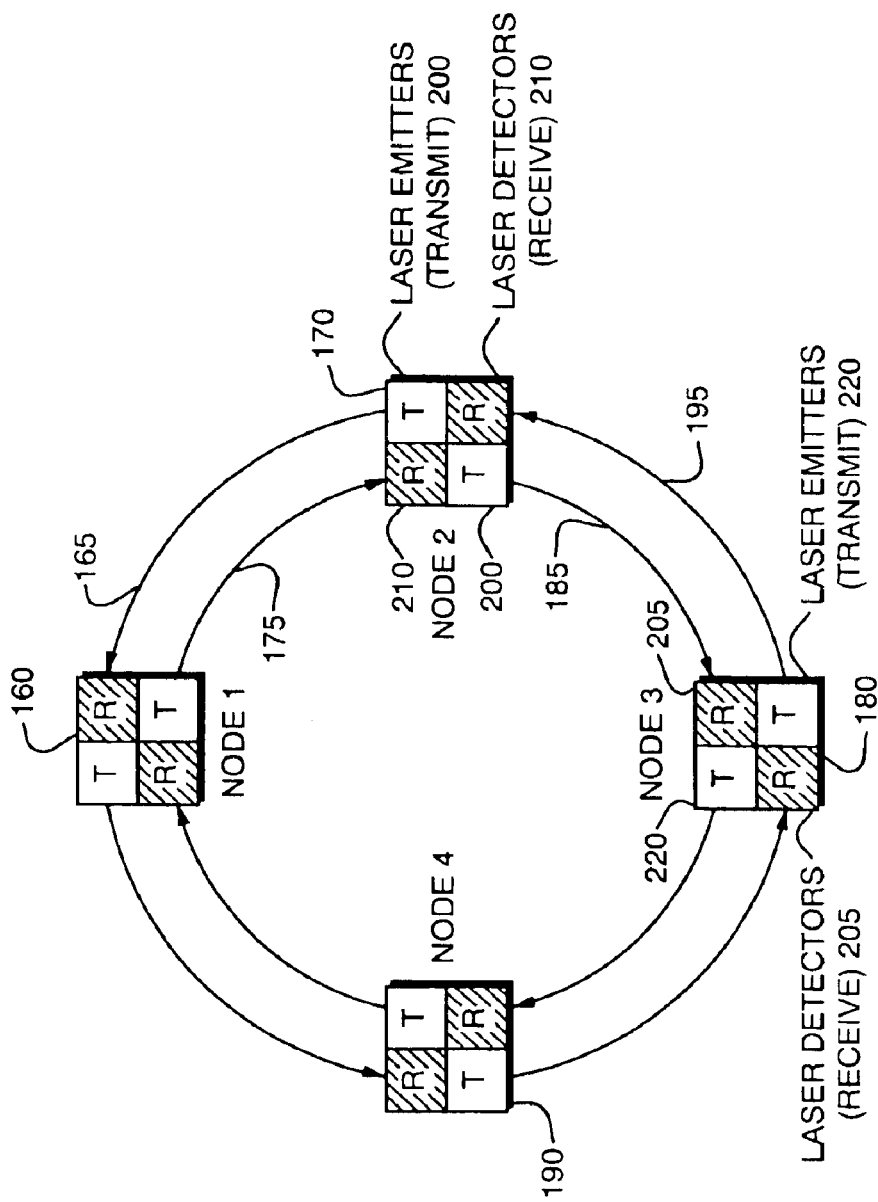
FIG. 4 ring topology with bi-directional transceivers fabricated
Figure 10A:
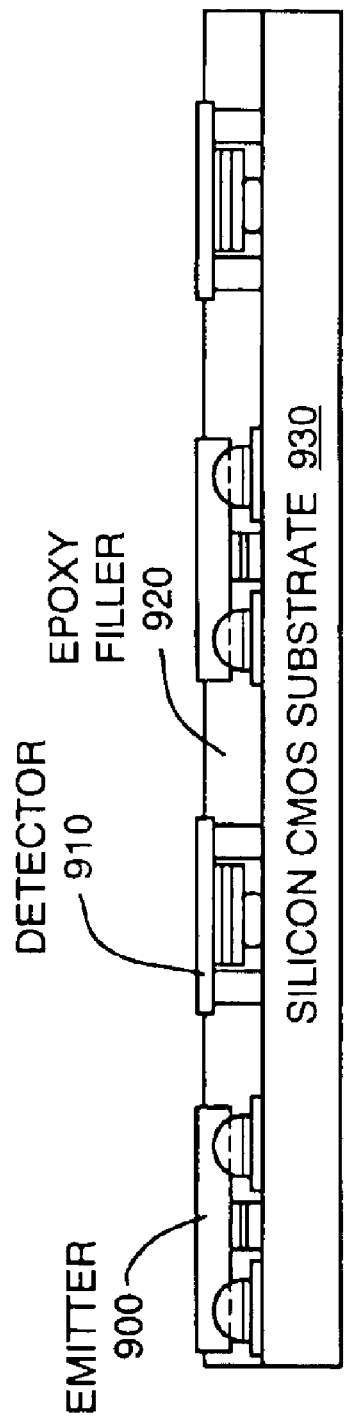
FIG. 10A side view of integrated circuit

In order to overcome delays of network topologies like the ring and achieve higher network speeds requires fiber optic transmission medium as the interconnect means between systems and components. FIG. 4 is one embodiment of a simple Ethernet ring network that is implemented using arrays of semiconductor laser transmitters 200 and receivers 205 flip-chipped, or hybridized onto a silicon substrate as illustrated by FIGS. 10A and 10B. A ring topology is well known in the art, and in the conventional prior art rings, data is transferred around the ring until it reaches the destination node. The data that is being transferred around the ring contains destination address information along with additional data and error coding within the header portion. If data is sent from node 1 to node 3, the data would enter one of the intermediate nodes which would read the destination information before allowing the data to continue transmission to node 3. There is a delay in having the node read the various addressing information for each packet of data, which is generally termed latency.

For the ring topology shown in FIG. 4, each node 160, 170, 180 and 190 have a dedicated transmitter (T) and receiver (R) on each ring interconnect. The fiber optic connections are used for each node to transmit and receive data from the node on either side. Two rings are utilized to achieve bi-directional data flow, and the arrows indicate the direction of data flow. Each node is equipped with the necessary digital logic (not shown) required to buffer data and perform all the standard Ethernet protocol requirements.

For example, node 2 has a transmitter 200 that is connected to a fiber optic cable 185 to node 3 and a receiver 210 connected to a fiber optic cable 195 from node 3. Likewise, node 3 has a transmitter 220 that is connected with a fiber optic connection 195 that connects to a receiver 210 on node 2. Thus, node 2 and node 3 can transmit and receive data as between themselves.

All data coming from node 2 is on connector 185 and is received on the node 3 receiver 205. This reserved communication channel therefore does not require the conventional addressing scheme, although some addressing or destination addressing may be required to indicate when the node is operating in a pass-thru state and delivering the data to the next node.

As a bi-directional data flow node, the nodes can send data in either direction. Thus, the best and/or shortest path may be used to send the data. This also enables the system to be self-healing, and send data in the opposite direction if a node in the ring malfunctions.

Figure 5:
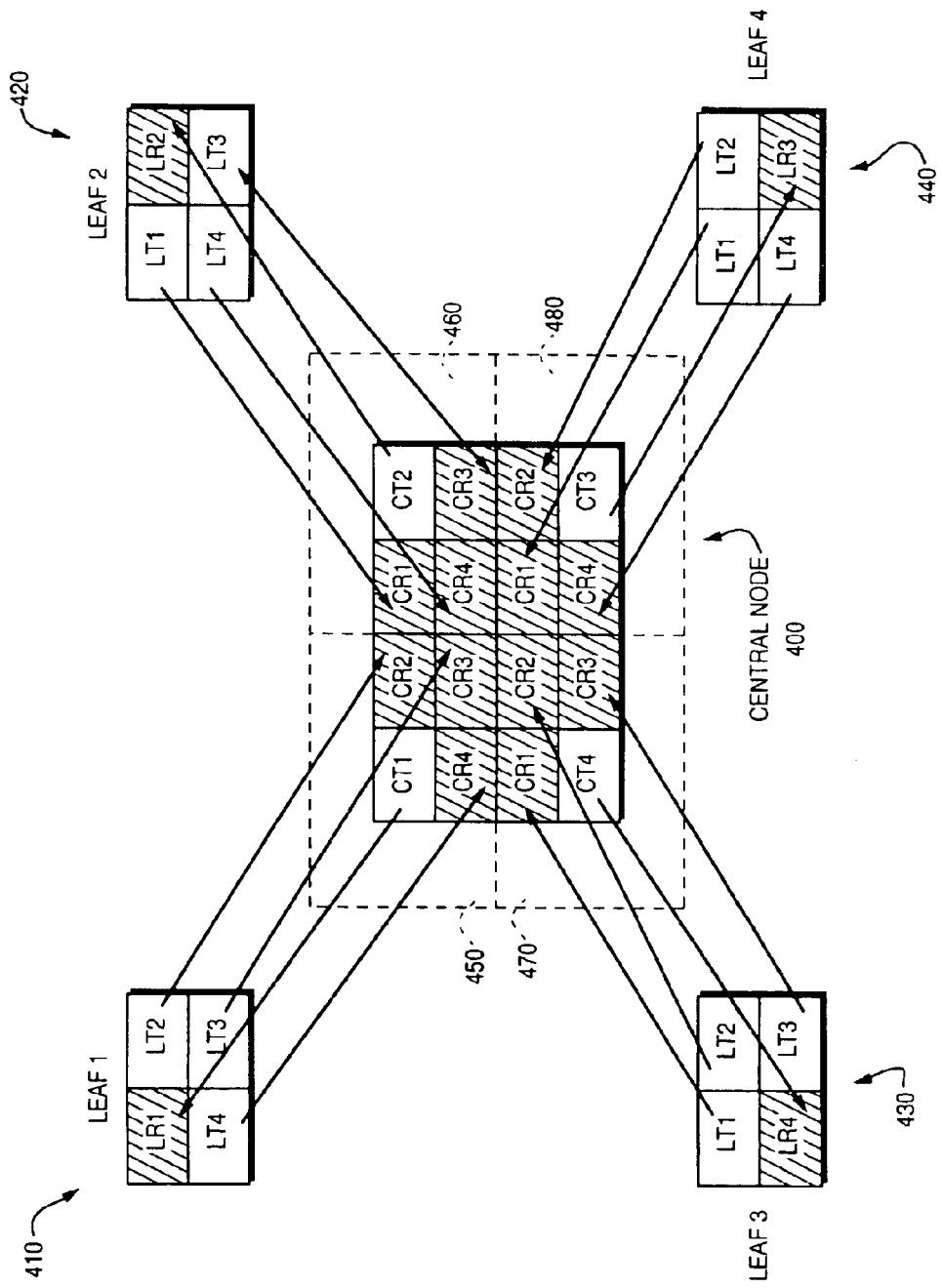
FIG. 5 receiver reserved star configuration

FIG. 5 illustrates a preferred embodiment of a star topology with four 2×2 leaf nodes 410, 420, 430, 440 and a single 4×4 optoelectronic array designated central node 400. The leaf nodes provide the optical leaf transmitter (LT) and leaf receiver (LR) locations while the central node 400 encompasses the central node transmitters (CT) and central node receivers (CR). The 4×4 array of the central node 400 is divided into four 2×2 arrays that map directly to each 2×2 leaf node.

According to the implementation of the present invention, the fiber bundles from the central node 400 can be directed or re-directed to any of the leaf nodes 410, 420, 430, 440. Thus, the upper left quadrant 450 of the central node 400 can be piped to leaf node 4 (440) rather than leaf node 1 (410) by directing the fiber bundle and attaching to the specified leaf node. Or, as an obvious variation, the fiber bundle from leaf node 4 (440) can be directed to the upper left quadrant 450 of the central array 400.

This particular embodiment is a receiver reserved convention, that provides an efficient method of data transfer. The term receiver reserved channel (RRC) means that each node has associated with it a single receiver on which it always receives data. The central node contains receivers for the transmitters of the leaf nodes. Thus, leaf nodes do not receive data intended for other leaf nodes in the network, as in the case of conventional ring network topologies. Each leaf node transmits data to an associate node on the network along a specific optical link.

The capability to transmit and receive data on specific optical links also reduces the logic circuits that buffer and route data at each node thereby reducing the cost as compared to a conventional Ethernet ring topology. The central node however does contain the logic circuitry to direct data flow throughout the network. Data transmitted from each channel of each node moves into the central node where the data is buffered and routed according to the network protocol standard. The central node is equipped with the necessary logic circuits to perform standard ring protocols as well as receive data from all channels simultaneously.

More specifically, in the example shown in FIG. 5, three lasers denote the three destination channels. When the central node receives data on a specific detector, it knows exactly which leaf is the destination. Address lookup is eliminated, but at the expense of only being able to transmit data usually on only one of the four leaf emitters at a time, unless all the leaves are selected to be the destination at the same time.

For example, all data intended for leaf node 4 (440) will only be transmitted to LR3. All data from the other nodes that is received by any of the central node reserved receivers CR3, will automatically be directed to the central node transmitter CT3 and transmitted to LR3. The central node 400, that handles data management, will only use CT3 to send data to LR3. The dedicated links between the central node 400 and the leaf nodes eliminates node addressing. More importantly, the latency is decreased because the central node does not have to read destination address information on data arriving on the dedicated receivers. Furthermore, the circuitry on the leaf node is minimized by eliminating the need for reading addresses on the transmitted data onto the node.

The central node contains a central processing unit (CPU) that controls the data flow on the network. The CPU is the processing center that directs data coming from another node or from another source. The CPU receives the incoming data/messages and is responsible for reading the header information. As noted herein, this information would be minimal, as the addressing information is determined by the channel being used and not by the destination address information in the header. The header may contain the length of the data and possible some error correction scheme.

The receiver reserved concept as illustrated in FIG. 5 has a potential for contention if multiple leaf nodes all transmit to the same node at the same time. In this instance the central nodes controls the data flow so no data is lost. One embodiment to control data flow is by using FIFO buffers to hold data until the receiving node is ready.

Figure 6:
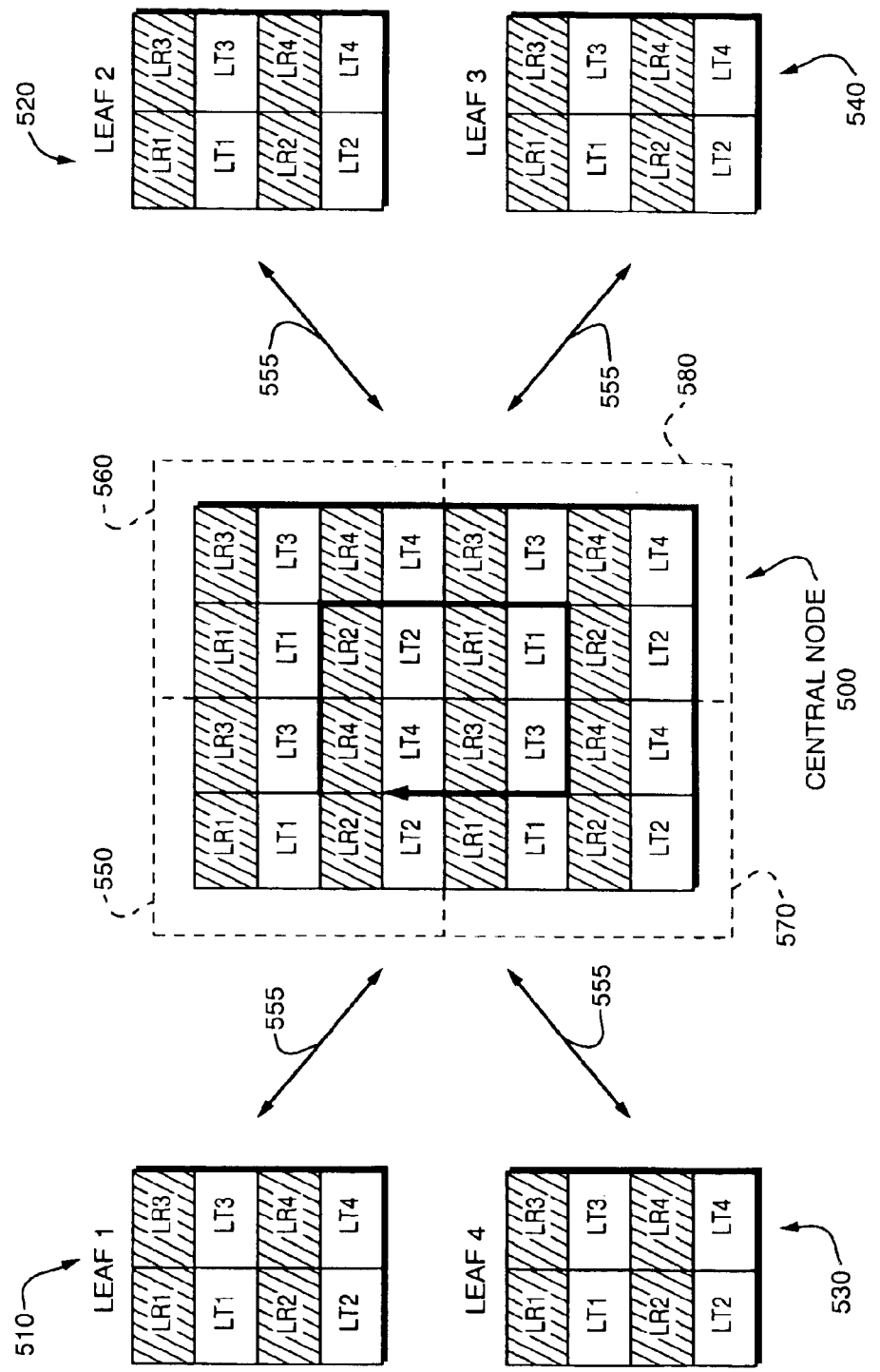
FIG. 6 star network with individual interconnections

In FIG. 6, four 4×2 leaf nodes 510, 520, 530, 540 send data to and from a 4×8 central node 500 which is divided into subarrays 550, 560, 570, 580 and accepts the data from each of the leaf nodes. In this example, each of the leaves is a 2×2 node, that provides a 4 bit, bi-directional bus 555. Each of the leaves sends and receives a 4 bit bus packet to from the central node 500. The central node 500 uses RRC to function as a 4×4 crossbar directly routing incoming data from each leaf node 510, 520, 530, 540 out to the appropriate output destination, or it takes the data from each node and routes it in a circular pattern through each quadrant or subarray 550, 560, 570, 580 and then clocks it out to the appropriate leaf node when the data is underneath the appropriate emitters. Thus, the present invention allows a system to be logically configured as either a ring or a star topology with a single physical connection.

Unlike the receiver reserved channel example of FIG. 5 that spatially separates the signals and eliminates address lookup, the embodiment of FIG. 6 uses all of the pixels for each data path and therefore needs addressing and lookup. FIG. 6 has four bit wide busses from each leaf node at all times for data, but does require address decoding, typically header information containing destination information. Thus the embodiment of FIG. 6 will have an increased latency in reading the address information.

One feature of the present invention is that it is scaleable. The system can grow in the number of pixels and in the number of channels to get various combinations of FIGS. 5 and 6.

For example, if each leaf node was a 16×16 array and the central node a 32×32 array, there could be four leaf nodes which had 8×8=64 bit wide busses which communicate to the central node. And, because each leaf node has four 8×8 arrays, we could still use a receiver reserved protocol and eliminate address lookup. In general, the size of the leaf and central node along with the number of leaf nodes that are required to be supported will dictate whether the configuration of FIG. 5 or FIG. 6 or a combination approach is used.

Figure 7A:
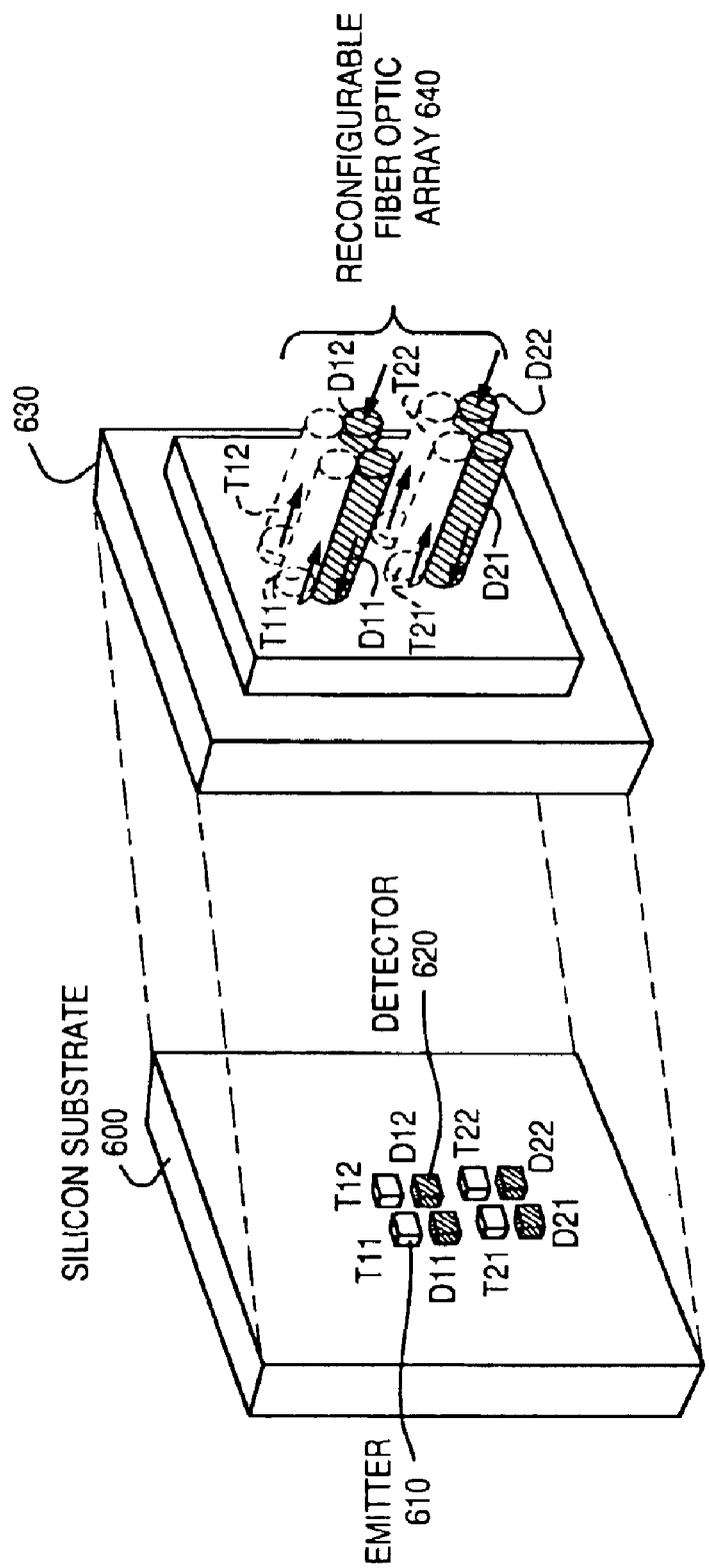
FIG. 7A depiction of fiber optical interconnect for reconfigurable array

FIG. 7A shows a silicon substrate 600 with two 2×2 arrays of paired emitters 610 and detectors 620 formed on the substrate. The emitters 610 and detectors 620, possibly VCSEL, are attached to the surface of the silicon substrate 600 and interconnected by CMOS circuitry (not shown). The CMOS circuitry on the silicon substrate electrically connects the optical devices 610, 620 and provides driver and receiver logic and possibly other logic functions including, but not limited to, encryption/decryption, packet routing, packet encapsulation, packet segmentation/reassembly, and other network packet processing.

Figure 7B:
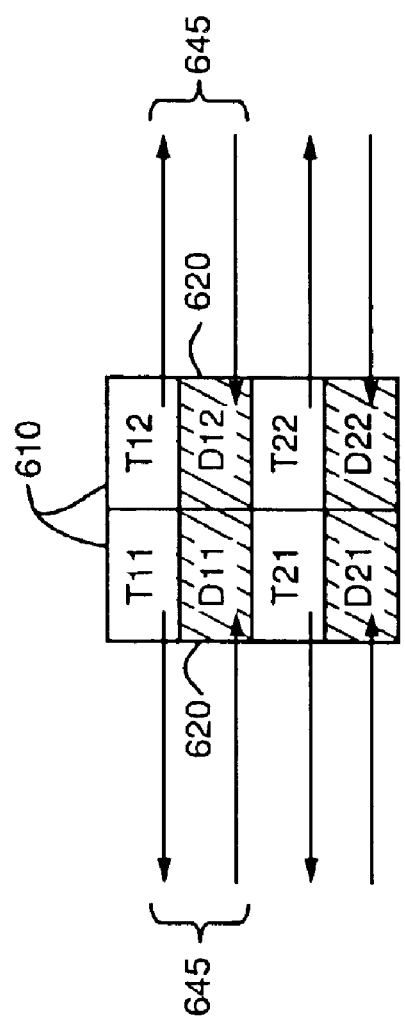
FIG. 7B representation of optical interconnect of reconfigurable array

The optical interconnect or image guide 630 is used to couple the laser emitters 610 and laser detectors 620 to the fiber optic cables 640. The optical interconnect 630 houses the fiber bundles 640 and facilitates the mating and alignment to the emitters 610 and detectors 620 on the substrate 600. Although the emitters 610 and detectors 620 are fixed in position on the silicon substrate 600, each fiber optic cable can be routed to any node or interconnecting device. This embodiment shows a one-to-one correlation between a specific emitter 610 or detector 620 on the substrate 600 and a fiber optic cable connection 640. And, as further shown in FIG. 7B, it is possible to route transceiver pairs T11/D11 and T12/D12 onto fiber optic bundles 645 and connect these emitters and detectors to any designated node or device.

Each fiber optic connection is relocatable from/to the central node, providing flexibility that enables the nodes to be logically moved within the network. For example, the mating fiber optic interconnect can be re-positioned so that the physical connection between the leaf nodes and the central node will change. Such reconfiguration is useful for many purposes, including changing topology, re-rerouting of signals, and improving uniformity in manufacturing.

Figure 8:
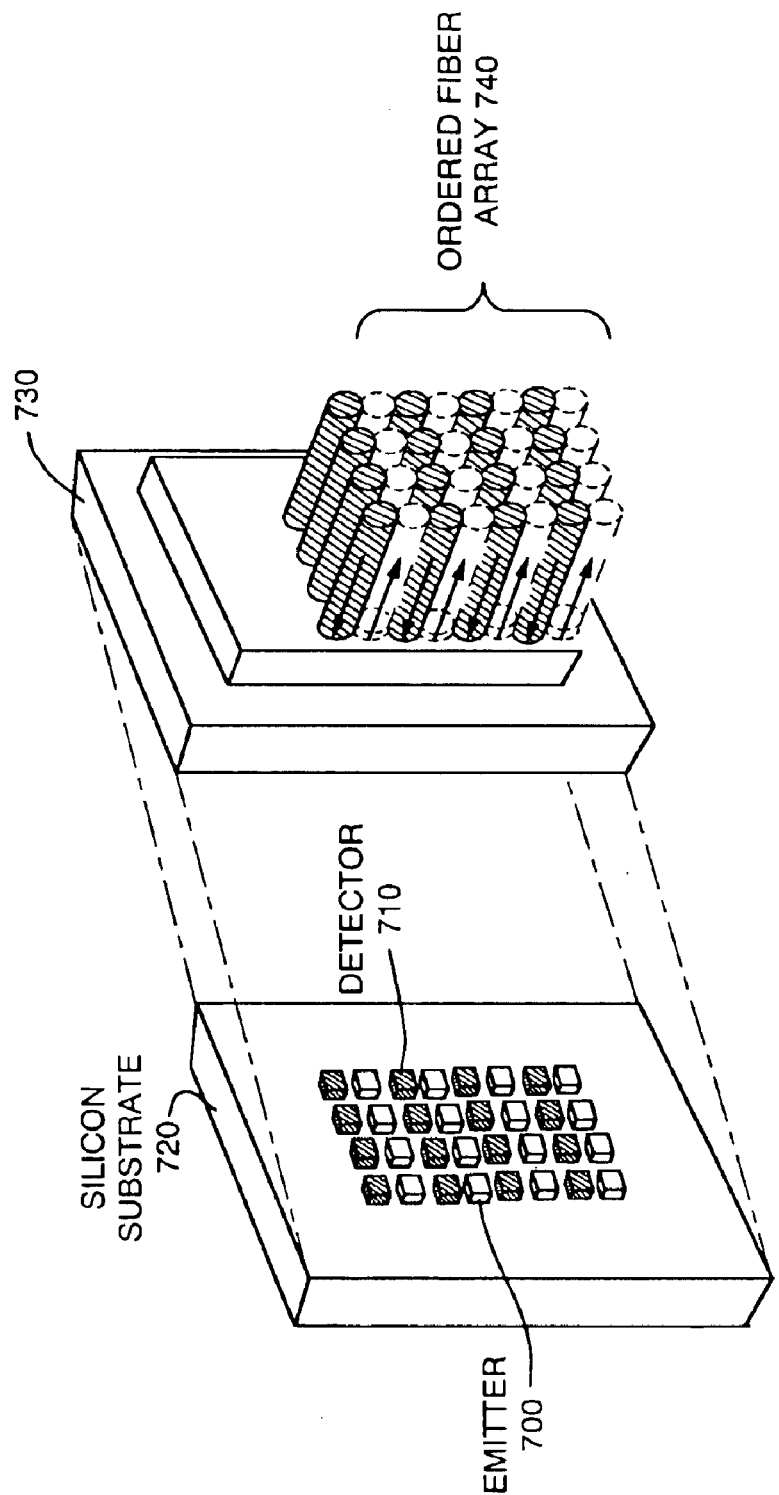
FIG. 8 depiction of fiber optical interconnect for ordered array

FIG. 8 is an illustration of a larger array, two 4×4 arrays, with emitters 700 and detectors 710 attached to a silicon substrate 720. The mating optical interconnect 730 is positioned to mate and align the ordered fiber array 740 in order to achieve a one-to-one correlation between the ordered fiber array 740 and the emitters 700 and detectors 710. Once mated, the ordered fiber array can be split and bundled to configure different topologies and otherwise direct the optical data in a re-configurable manner.

Figure 9A:
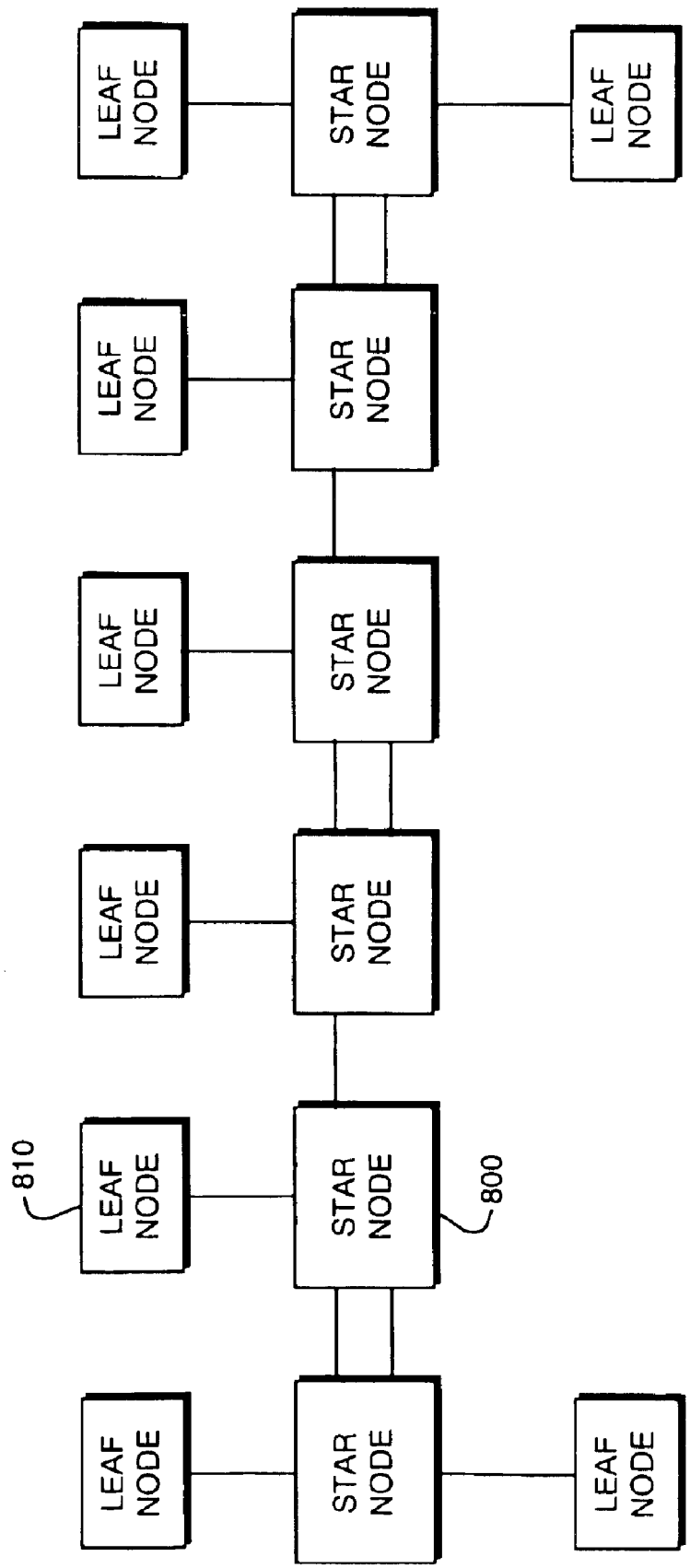
FIG. 9A example of linear topology constructed from star nodes
Figure 9B:
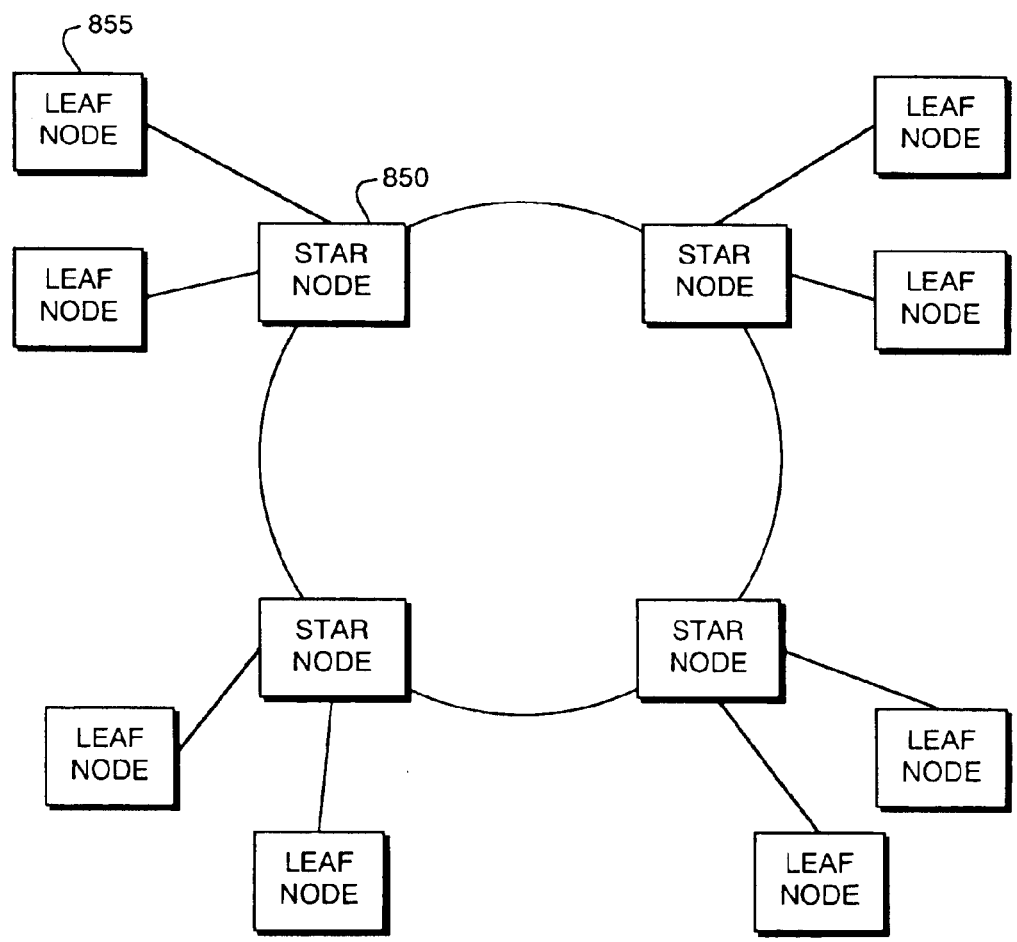
FIG. 9B example of ring topology constructed from star nodes
Figure 9C:
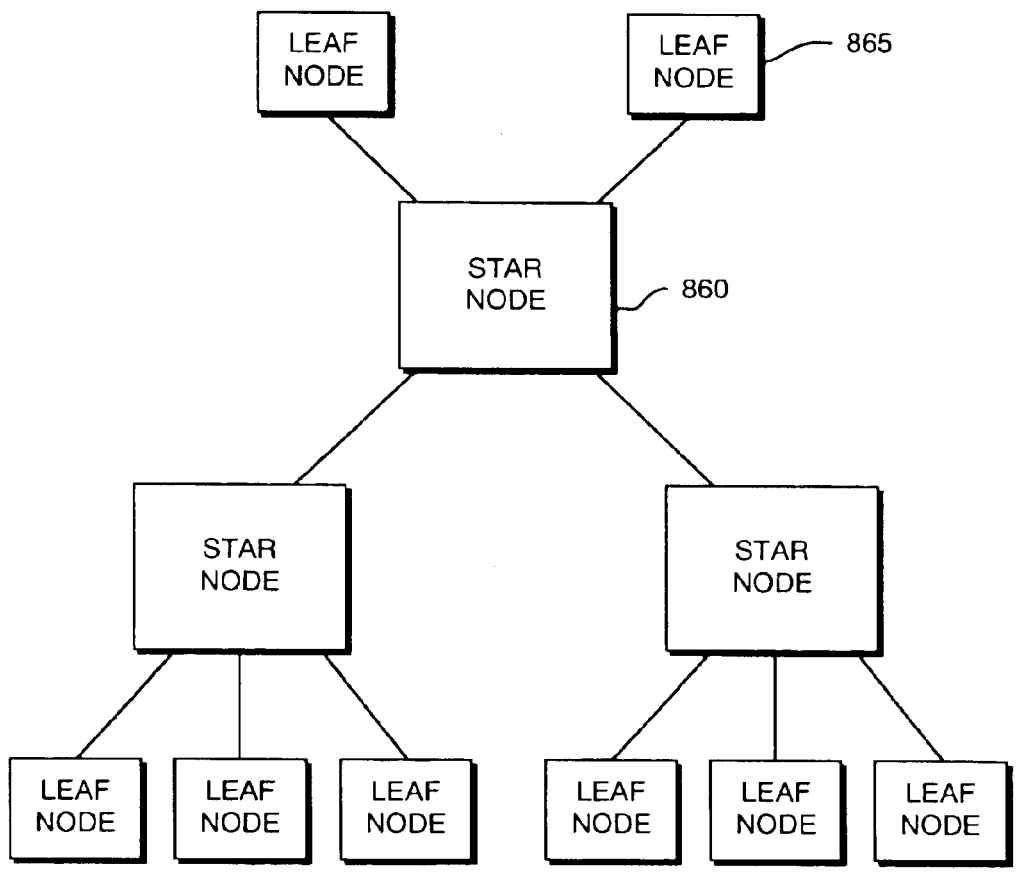
FIG. 9C example of tree topology constructed from star nodes

Examples of the reconfiguration of a star network to different topologies are shown in FIGS. 9A, 9B, and 9C. In FIG. 9A a linear topology is depicted, wherein a plurality of four-port star nodes 800 has four connections that interconnect the star nodes 800 and a plurality of leaf nodes 810. In this example, eight end nodes are interconnected by six star nodes. FIG. 9B shows a ring topology obtained by connecting four star nodes 850 with eight leaf nodes 855. Finally, a tree topology can be implemented by branching out the fiber bundles from the three star nodes to eight leaf nodes. According to the present invention, the fiber bundles can be divided and connected to achieve any of these configurations.

A cross-sectional view of the bi-directional, high-speed computer network interconnection communication device with laser emitters 900 and detectors 910 attached onto a semiconductor substrate 930 is depicted in FIG. 10A. A further description of the fabrication technology is described in the incorporated references. The emitters 900 and detectors 910 have electrical connection with electronic circuitry (not shown) previously built on the silicon substrate 930.

A silicon substrate is the base and has alternating laser emitters 900 and detectors 910 attached to the upper surface. The fabrication is accomplished by building light emitting devices such as laser devices known as Vertical Channel Surface Emitting Lasers (VCSELs) or light emitting diodes (LEDs or RCLEDs) out of light-emitting semiconductor material such as gallium arsenide and other III–V compound materials including ternary and quaternary compounds. Once the devices formed the next step is "flip-chipping" the devices onto the top of the silicon substrate 930. The devices are electrically connected to CMOS circuitry (not shown) that has been fabricated onto the silicon substrate, through contacts, such as ball-grids, located on the bottom of the devices.

The star topology can be scaled to larger and more complex networks until the practical limits of assembly are exceeded. For example, a 1000 node system containing sixteen by sixteen arrays would require a central node with an array one thousand times larger than sixteen by sixteen array. For large systems, the central node array 955 is divided into several smaller arrays or subarrays where each smaller array is optically coupled as illustrated in FIG. 10B. The central node fiber bundles 950 interconnect to smaller central node arrays enabling the larger central node 955 to operate at fiber optic speeds. The leaf nodes connections 960 of the divided central array 955 transmit optical data from the divided central node 955 through optical fiber bundles 960 to specified leaf nodes.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A network device for optical data communications, comprising:
   a two-dimensional central array comprised of a plurality of central node transmitters and a plurality of central node receivers, wherein said central array is divided into at least one subarray;

at least one secondary node comprised of at least one dedicated secondary node receiver and a plurality of secondary node transmitters, wherein each secondary node is respectively coupled to said subarray, and wherein each said dedicated secondary node receiver and said plurality of secondary node transmitters are coupled to each said subarray;

a plurality of optical communications lines coupling said central array and said secondary node; and a means for processing said optical data using a receiver reserved protocol wherein each said secondary node receives said optical data only on said dedicated secondary node receiver and said secondary node transmits said optical data to said central node receivers of said subarray.

2. The network device according to claim 1, further comprising at least one additional central array coupled to said central array and said secondary node.

3. The network device according to claim 2, further comprising at least one secondary node coupled to said additional central array.

4. The network device according to claim 1, wherein said optical data includes minimal header information.

5. The network device according to claim 1, wherein said optical communications lines is an ordered fiber array.

6. The network device according to claim 1, wherein said optical communications lines are coupled with a one-to-one correspondence between said central array and said secondary node.

7. The network device according to claim 1, wherein said central node transmitters are selected from the group consisting of Vertical channel surface emitting lasers (VCSELs), light emitting diodes (LEDs) and Resonant Cavity Light Emitting Diode (RCLED).

8. The network device according to claim 1, further comprising a central array processor on said central array with a first-in-first-out (FIFO) buffer.

9. The network device according to claim 1, wherein each said secondary node is a leaf node.

10. The network device according to claim 1, wherein each said secondary node is a combination of at least one additional central array and at least one additional leaf node.

11. The network device according to claim 1, further comprising a watchdog function for each said secondary node.

12. A reconfigurable optical data communications topology, comprising:

a two-dimensional central optoelectronic array divided into a plurality of subarrays, each of said subarrays having a plurality of central array emitters and a plurality of central array detectors, wherein said central array emitters and central array detectors are fabricated onto a substrate and coupled to electronic circuitry;

an ordered fiber array comprising a plurality of fiber optic cables that are coupled on a first end of said fiber optic cables to said central array emitters and said central array detectors, and wherein said ordered fiber array is divided into a plurality of fiber optic bundles at a second end; and a plurality of nodes each coupled to corresponding said subarrays, said nodes having at least one dedicated node detector and more than one node emitter, wherein said more than one node emitter and said node detector of each said plurality of nodes are optically coupled to said subarrays by said second end of said fiber optic cables, and wherein said central array communicates with said nodes using a receiver reserved protocol, each of said nodes receiving optical data only on said dedicated node detector and each said node emitter transmitting optical data to said central array detectors of said subarrays.

13. The reconfigurable optical data communications topology according to claim 12, wherein said topology is configured from the group consisting of: linear bus network, tree topology, star network, switched fabric and ring network.

14. The reconfigurable optical data communications topology according to claim 12, further comprising an optical interconnect coupling said central optoelectronic array to said ordered fiber array.

15. The reconfigurable optical data communications topology according to claim 12, wherein at least one of said nodes comprises a central processing unit.

16. The reconfigurable optical data communications topology according to claim 12, wherein at least one of said nodes is on said substrate.

17. The reconfigurable optical data communications topology according to claim 12, wherein said at least one node detector communicates with said central array over a multi-bit bus.

18. The reconfigurable optical data communications topology according to claim 12, further comprising an arbitration scheme.

19. The reconfigurable optical data communications topology according to claim 12, wherein said fiber optic bundles at said second end are relocatable to another node.

* * * * *